United States Patent [19]
Bates et al.

[11] Patent Number: 4,764,210
[45] Date of Patent: * Aug. 16, 1988

[54] PRODUCTION OF LIQUID IRON

[75] Inventors: Cecil P. Bates; Terrence W. Shannon, both of Auckland, New Zealand

[73] Assignee: New Zealand Steel Limited, Glenbrook, New Zealand

[*] Notice: The portion of the term of this patent subsequent to Apr. 28, 2004 has been disclaimed.

[21] Appl. No.: 3,047

[22] Filed: Jan. 13, 1987

Related U.S. Application Data

[60] Division of Ser. No. 806,138, Dec. 10, 1985, Pat. No. 4,661,150, which is a continuation of Ser. No. 721,499, Apr. 10, 1985, abandoned, which is a continuation of Ser. No. 609,653, May 14, 1984, abandoned, which is a continuation of Ser. No. 532,054, Sep. 14, 1983, abandoned.

[51] Int. Cl.$^4$ .............................................. C22B 4/00
[52] U.S. Cl. ................................... 75/10.66; 75/10.65
[58] Field of Search ....................... 75/10.65, 10.66, 26

[56] References Cited

U.S. PATENT DOCUMENTS 2,894,831  7/1959  Old .......................................... 75/26
3,140,168  7/1964  Halley ..................................... 75/26

Primary Examiner—Peter D. Rosenberg
Attorney, Agent, or Firm—Holman & Stern

[57] ABSTRACT

The invention relates to a method for producing liquid in an electric melter or furnace. The method relates to producing liquid iron in an electric melter, utilizing highly reduced sponge iron, which is defined as sponge iron resulting from reduction of iron bearing material, and having a degree of metallization being in excess of 60%. (Metallization is expressed as analyzed metallic iron divided by analyzed total iron).

The method comprises transferring the highly reduced sponge iron, together with at least some residual carbon, to a melter in a hot state and substantially in the absence of oxygen. This avoids heat loss and reoxidation. The highly reduced sponge iron and residual carbon are then passed in a controlled manner, into the melter, where one or more electrodes operate in a low resistance mode.

7 Claims, 3 Drawing Sheets

PRODUCTION OF LIQUID IRON

CROSS REFERENCE TO RELATED APPLICATION(S)

This is a divisional application of Ser. No. 806,138, filed Dec. 10, 1985, now U.S. Pat. No. 4,661,150, which is a continuation of Ser. No. 721,499, filed Apr. 10, 1985, now abandoned, which in turn is a continuation of Ser. No. 609,653, filed May 14, 1984, now abandoned, and which in turn is a continuation of Ser. No. 532,054, filed Sept. 14, 1983, now abandoned.

BACKGROUND TO THE INVENTION

This invention relates to improvements in the production of liquid iron in an electric furnace of melter.

It is well accepted that there are a number of methods and arrangements relating to melting iron bearing materials, which utilise iron bearing materials in a partially reduced state. This then means that a reasonably substantial amount of further reduction (and the consequential use of further power) must take place in the furnace or melter which is used for the production of liquid iron. As a result this requires high energy and power consumption which can be both a practical and economic problem. In addition, when such partially reduced materials are used in the production of liquid iron, further reduction of such iron bearing materials has shown that the carbon content of the resultant liquid iron has been low and in some cases insufficient for further satisfactory processing.

Further, in methods and arrangements used up until this time, where partially reduced iron bearing materials have been used, there has been a problem with the type of iron bearing materials or ores that could be used. Thus, because of the difficulties inherent in using some iron bearing materials (particularly when in a partially reduced state), time and effort has been required in the selection of the iron bearing materials, or feedstock. This is because certain materials (such as for example titaniferous iron sand) have not been able to be effectively used in the production of liquid iron using methods and arrangements used up until this time. In some methods used up until this time, the use of such iron bearing materials has made it very difficult (if not impossible) from a practical point of view, to accurately and adequately control the content and nature of the resultant liquid iron.

In addition, there has been a real problem in using fine iron bearing material. Where partially reduced material is used in a furnace or melter, substantial amounts of gases are formed during reduction within the furnace, and below the surface of the slag, formed on top of the liquid iron. The gas thus evolved, is the result of the only partially reduced nature of the iron bearing material and has up until this time, caused explosions and slag blows and boils within the furnace or melter. Where fine iron bearing material has been experimented with, it has been found inappropriate in such processes involving the use of partially reduced material. The fine iron bearing material or ore forming a slag, presents problems in that the gases below the surface will easily pass up and rupture through the slag of the fine material, this again causing explosions and slag blows and boils within the furnace or melter. This has detracted from the efficiency and general operation of methods and arrangements utilising partially reduced material, as used up until this time.

By way of example only, in methods and arrangements used up until this time, those skilled in the art would have generally been reluctant to utilise partially reduced iron bearing material which included by way of example only between 10% and 20% (by weight) below 6 mm in size. It will be appreciated therefore, that methods and arrangements used up until this time have not been able to take advantage of a large amount of iron bearing material, due to the deficiencies and problems associated with the methods and arrangements used and known up until this time.

As referred to hereinbefore, a further and very real problem associated with methods and arrangements used up until this time, is that where only partially reduced iron bearing material is used in a furnace or melter, the energy consumption is high and a large amount of gas is formed. Thus, not only is this a problem from an economic and power supply point of view, but the carbon content of the resultant liquid iron (resulting that is from the electric furnace) has in numerous cases been insufficient or at least unsatisfactory, for further processing or use.

It is an object of this invention to provide a method and arrangement for producing liquid iron in an electric furnace or melter which overcomes or at least minimises the problems encountered up until this time.

It is a further object of this invention to provide a method and arrangement for the production of liquid iron in an electric furnace or melter which is straightforward and efficient in operation.

SUMMARY OF THE INVENTION

Throughout the specification and claims, reference is made to "highly reduced sponge iron". The term is hereinafter defined throughout the specification and claims as sponge iron resulting from reduction and having a degree of metallisation in excess of 60%. In this regard, metallisation is expressed as analysed metallic iron divided by analysed total iron. As referred to herein, methods and arrangements used up until this time have used partially reduced sponge iron which has normally been less than 50% metallised.

According to a further aspect of this invention there is provided a method of producing liquid iron in an electric melter having one or more electrodes therein, comprising transferring sponge iron having a degree of metallisation in excess of 60%, together with residual carbon, in a hot state, to said melter, substantially in the absence of oxygen; controlling the passage of said sponge iron and residual carbon into said melter operating said one or more electrodes within said melter in a low resistance mode.

BRIEF DESCRIPTION OF THE DRAWINGS

The invention will be described by way of example only, and with reference to the accompanying drawings, wherein.

DESCRIPTION OF THE PREFERRED EMBODIMENTS OF THE INVENTION

Figure 1:
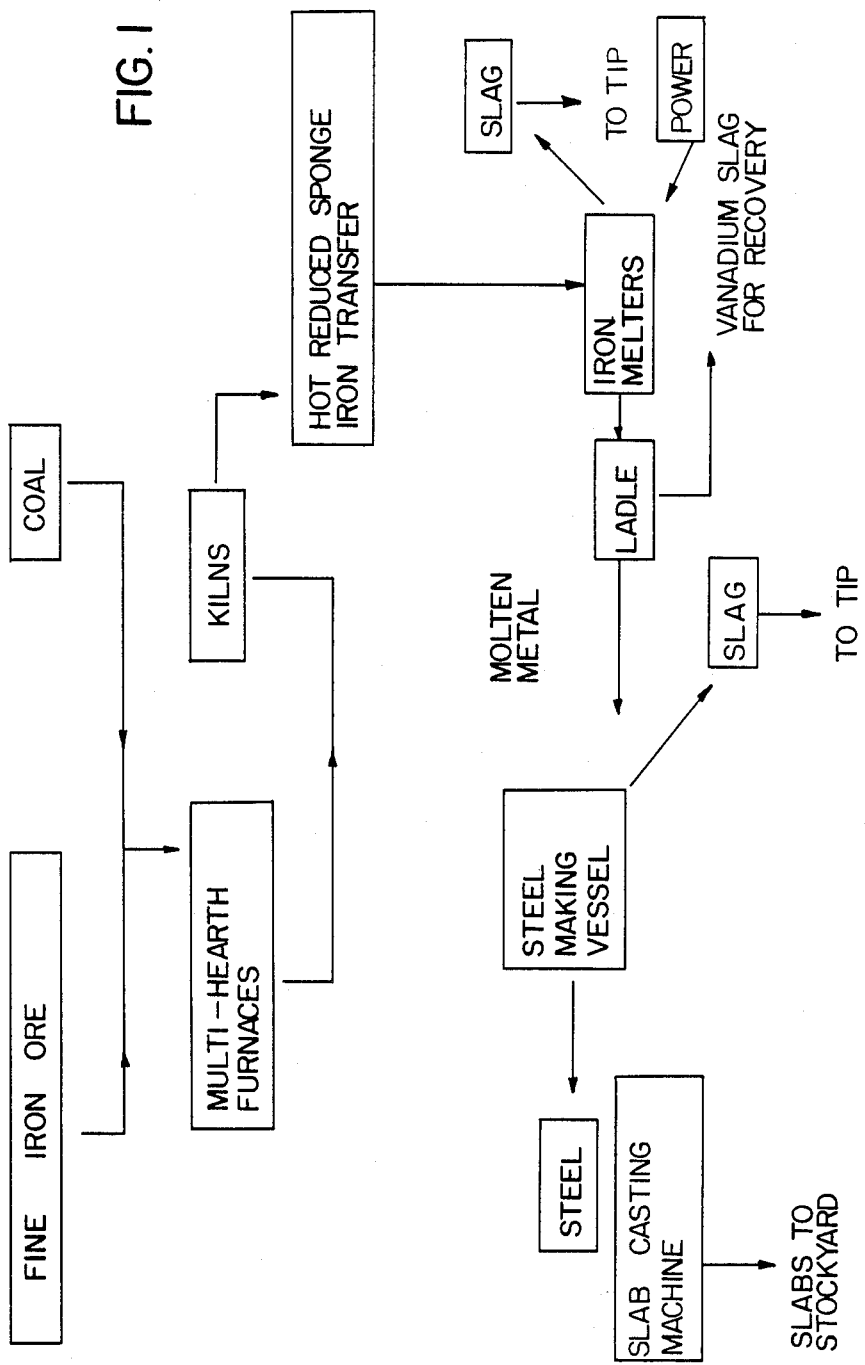
FIG. 1: is a diagrammatic view of a process route according to one form of the invention.

The present invention relates to the production of liquid iron in an electric furnace or melter, hereinafter referred to throughout the specification and claims, as a "melter"), using sponge iron which has been highly reduced by reduction, such as in an appropriate reduction apparatus, arrangement, or kiln. As referred to hereinbefore, the term "highly reduced sponge iron", is herein defined throughout the specification and claims, as sponge iron with a degree of metallisation in excess of 60%, with metallisation being expressed as analysed metallic iron divided by analysed total iron. This definition of "highly reduced sponge iron", is used throughout the specification and claims, to differentiate from other known processes that use partially reduced sponge iron, this being normally less than 50% metallised (typically 20% to 40%). Prior art literature and industrial practice disclose that electric melters have been fed with cold and hot partially reduced iron ore, or other materials. The reduction of these materials has however typically been from 20% to 40% and thus the material has not previously been highly reduced as is required and disclosed by the present invention. In addition, it is also well documented that highly reduced ores can very easily reoxidise (with the consequent rapid rise in temperature that leads to scintering and agglomeration of the reduced material).

It has been found in experimentation that it is preferable that the highly reduced sponge iron of the present invention have a degree of metallisation being above 75%. It has been further found that a metallisation range of between 85% to 87% is particularly desirable. It should be appreciated however that this level of metallisation above 60% may change with different ore analysis.

The present invention therefore provides a method and arrangement for the production of liquid iron using an electric melter, wherein an amount of highly reduced sponge iron is fed to the melter. The highly reduced sponge iron is preferably transferred to the melter in a hot state with residual carbon resulting from a previous reduction process (such as in a reduction apparatus or kiln). This then provides residual carbon and superheat to assist in the hot transfer of the highly reduced sponge iron from the kiln to the melter. It also allows the liquid iron to be in a form having sufficient superheat and carbon, suitable for further steelmaking processes.

While reference is made to the highly reduced sponge iron being transferred in a hot state, and thereafter being passed into a melter, it should be appreciated that the transfer and passage into the melter need not necessarily be at high temperatures. It should be further appreciated however, that if hot transfer and passage into the melter does not take place, a risk of re-oxidation increases; in addition, additional energy and power will be required in the melter.

The highly reduced sponge iron with residual carbon is transferred to the melter in a hot state, preferably by means of one or more appropriate transfer vessels, substantially in the absence of oxygen. Thus, the highly reduced sponge iron is transferred from the kiln to the melter without any major temperature loss and without any significant reoxidation.

One of the real problems with processes used up until this time, has been the substantial energy requirements. In particular substantial electrical energy requirements. Thus, by transferring the highly reduced sponge iron to the melter, in a hot state and substantially in the absence of oxygen, there is a significant reduction in the requirement for electrical energy by the melter for the melting of the sponge iron. In addition, and as referred to hereinbefore, a relatively high level of carbon is provided in the liquid iron, which is particularly suitable for further steelmaking processes.

The present invention also allows for the use of highly reduced sponge iron in a fine form, (which has not been realistically possible up until this time). The highly reduced sponge iron is also able to be melted effectivley due to the relatively low volumes of gas generated in the melter, from the highly reduced sponge iron. Any gases evolved or formed in the melter (which are relatively small compared with the amount of gases evolved in prior methods and arrangements), are able to escape through the fine material, forming at least part of a liquid slag within the melter, without (or at least substantially reducing) the danger of explosions or slag boils or blows. As will be appreciated, this is a substantial advantage over previous and known methods and arrangements. In addition, the method and arrangement of the present invention allows a substantially open pool or area of molten slag to form in a reaction zone or area (substantially about and adjacent to one or more electrodes in the melter). This also allows at least some of the gas formed, to escape through the pool, without the need to permeate through the slag.

In use, it is envisaged that the size of the fine ore or iron bearing material will be such that generally about 60% (by weight) of the material will be between 106 microns and for example 212 microns. It is envisaged that material used in large scale plants will allow for larger lumps of agglomeration of up to for example 150 mm.

Examples of the size of the iron ore, or iron bearing material used in trials are for example:

+300 microns: 15%
+212-300 microns: 7%
+150-212 microns: 23%
+106-150 microns: 42%
+75-106 microns: 13%
+53-75 micronss: 1%
−53 microns: Nil The ability of the present invention to utilise presently used ores and fine ores (not previously considered suitable or appropriate), means that the present invention has a far greater application and an ability to use a very great range of iron bearing materials.

The method and arrangement of the present invention also provides for hot, highly reduced, sponge iron to be fed or passed into the melter, in a controlled manner, through suitable control means, (such as valving, screw feeds or vibratory feeds), so that the amount of highly reduced sponge iron being fed into the melter is able to be closely controlled and monitored. In this manner, the power supplied to the one or more electrodes, for melting within the melter, can be accurately matched by the energy required to meet the controlled feed of highly reduced sponge iron. This then also enables the slag and metal temperatures to be controlled, this contributing substantially to the efficiency and operation of the present invention.

The power fed to the one or more electrodes of the melter, preferably has its voltage and current controlled in an appropriate manner and by appropriate control means, such that the total energy supplied is sufficient for melting within the melter, while the resistance is suitably controlled. This thereby permits a relatively high carbon content liquid iron to be made with valuable vanadium in solution; while no significant quantities of other metalloids (such as for example silicon, titanium or manganese) are present to any great extent.

In a preferred form of the invention, the highly reduced sponge iron together with residual carbon, (preferably being substantially the total kiln discharge with both residual carbon in the char and the highly reduced sponge iron being mixed), is hot transferred (that is to say transferred in a hot state substantially in the absence of oxygen) from a kiln or reduction housing or apparatus to the melter. It is advantageous therefore, that the residual carbon in the char is present, in that this significantly assists in preventing reoxidation. This then permits the hot transfer to, and passage into, the melter, without significant heat loss or re-oxidation. It is to be appreciated that there is always a chance that some oxygen may be present or may enter a transfer container or vessel used for hot transfer; in such a case any oxygen that may be present or may enter, is immediately combusted with some of the residual carbon. This then will not effect the highly reduced sponge iron or immediately effect the temperature thereof. Indeed, it has been found that during the hot transfer, any oxygen present will combust with residual carbon and a protective atmosphere of carbon monoxide will be generated and formed. This will then generally substantially prevent or minimise re-oxidation of the highly reduced sponge iron.

As will be appreciated, it is desirable that the highly reduced sponge iron be transferred in a hot state, such as from the kiln to the melter. It is also highly desirable that re-oxidation be prevented (or at least minimised) during such hot transfer. As indicated hereinbefore, in the preferred form of the invention, residual carbon is transferred to the melter together with the highly reduced sponge iron.

If however, only a small amount of carbon is present during the hot transfer, an artificial atmosphere (such as for example a reducing gas or nitrogen), can be introduced into the container or vessel used for the hot transfer, this preventing or minimising contact between oxygen and the highly reduced sponge iron. Such a reducing gas or nitrogen will then act as a substitute for (or in addition to), the carbon. It should be appreciated that the provision of nitrogen is a highly desirable safety feature, to prevent damage to plant when the kiln discharge is not fully under control (such as for example during start up, shut down, or under emergency situations such as power failure).

Referring to FIG. 1 of the accompanying drawings, it will be seen that fine iron ore and coal are used to form the highly reduced sponge iron. As referred to hereinbefore, the present invention allows for the use of fine iron ores and fine iron bearing materials, such materials not having been capable of effective use up until this time. Preferably, coal is used in the reduction process, this avoiding use of expensive electrical power and thus saving on energy costs.

As will be appreciated from the foregoing description, the iron bearing material (preferably in a relatively fine form), is highly reduced (such as herein defined). The highly reduced sponge iron preferably together with residual carbon, is then transferred in a hot state and substantially in the absence of oxygen to one or more melters.

The slag is removed from the iron melters and is tipped. Iron from the melters passes to a steel making vessel, whereafter it is formed into slabs. In the preferred form of the invention as shown in FIG. 1 of the accompanying drawings, the molten metal from the iron melter is passed into a ladle, for the recovery of valuable elements such as vanadium. Slag from the steel making vessel is taken or passed to one or more appropriate tips.

The highly reduced sponge iron (as herein defined), preferably together with residual carbon, is transferred to a melter, preferably in a hot condition and substantially in the absence of oxygen, in one or more appropriate vessels or buckets. In alternative forms of the invention, the hot highly reduced sponge iron can be transferred by way of enclosed conveyors, or other suitable containers. In the preferred form of the invention, it is however important that the highly reduced sponge iron be transferred in a hot condition and without any substantial oxidation taking place. Thus, in this way, the highly reduced sponge iron and residual carbon entering or passing into the melter is still in a hot condition having superheat properties, and still having valuable carbon properties.

Figure 2:
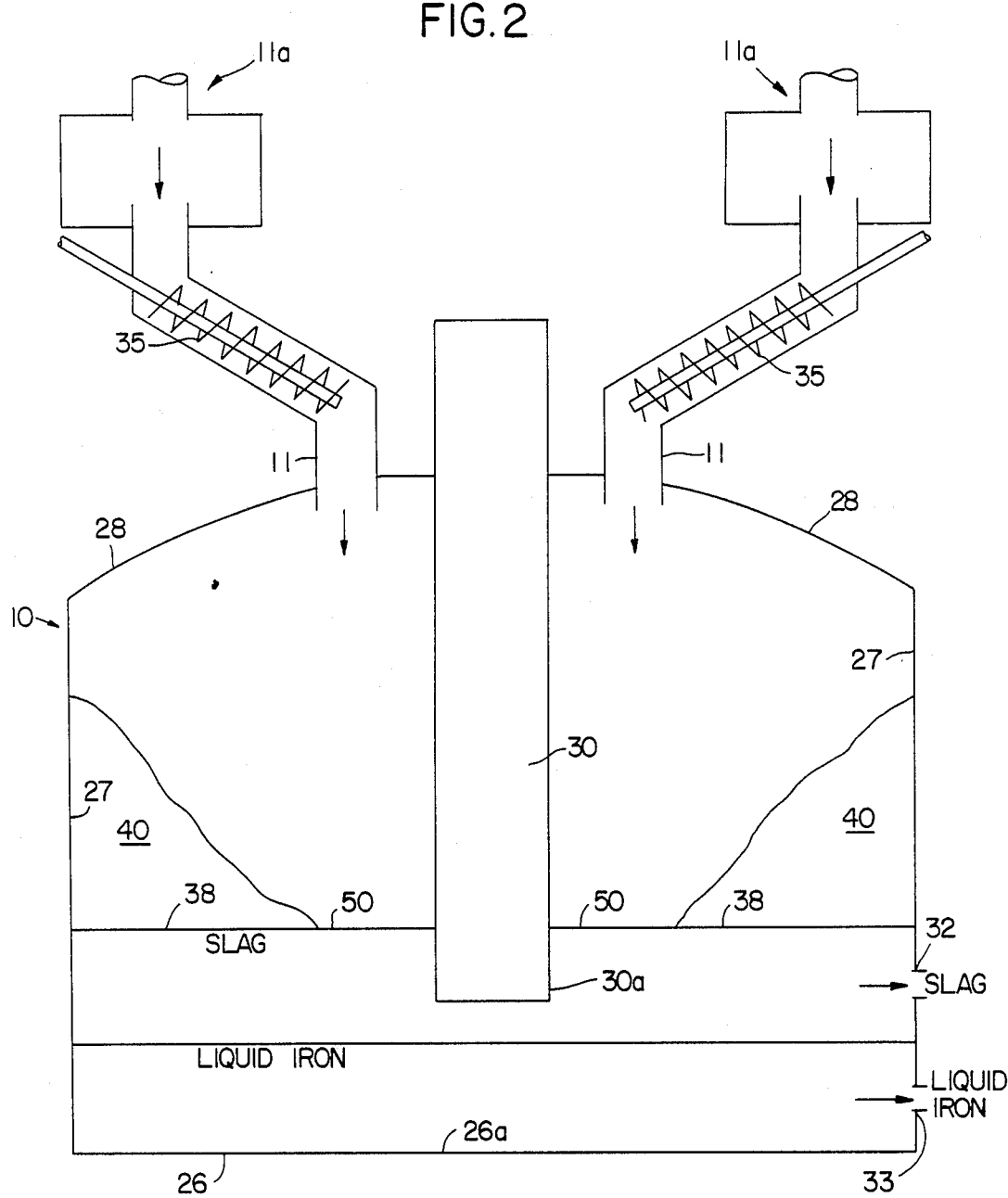
FIG. 2: is a view of a melter as used in one form of the present invention.
Figure 3:
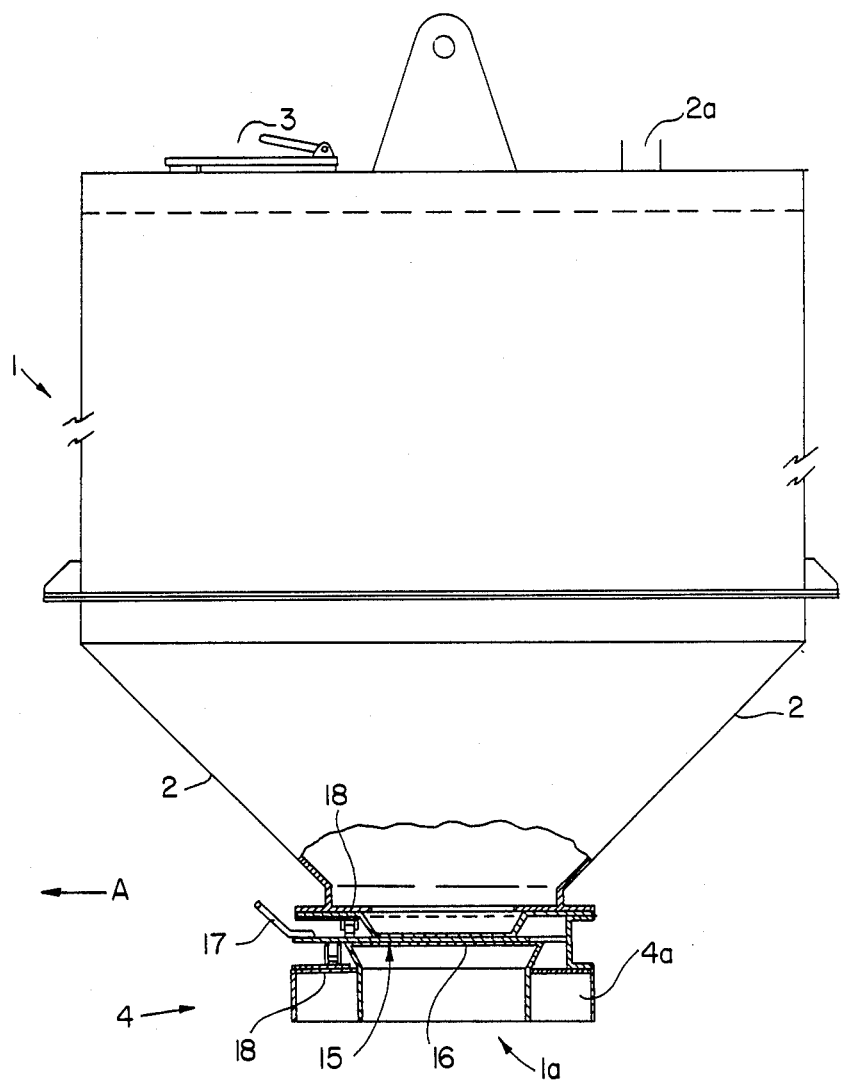
FIG. 3: is a view of an example of a hot transfer vessel for use in accordance with one form of the present invention.

Referring to FIGS. 2 and 3 of the accompanying drawings, an appropriate vessel 1 used for the hot transfer is shown. The vessel 1 has a main body portion, with angled or slanted lowered sides 2, the vessel having at least one inlet port 3 at an upper end thereof, and an outlet port 4 at the lower end thereof. The inlet and outlet ports 3 and 4 are provided with air-tight or sealable closures so as to prevent the ingress of oxygen into the container 1, during the passage of the hot, highly reduced, sponge iron (into and from the vessel 1).

For example the vessel 1 is positively located under a hopper or bunker (not shown) at the end of, or connected to, a kiln, and into which the highly reduced sponge iron and carbon are passed from the kiln, (and held prior to hot transfer). A lower end of the kiln hopper is provided with a suitable airtight or sealable valving arrangement, which engages in an air tight seal, with the inlet port 3, so that the hot and highly reduced sponge iron passes from the hopper into the transfer vessel 1, in a substantially oxygen free manner. The port 3 is then closed, avoiding as far as possible the ingress of any oxygen. The transfer vessel 1 thereby holds the charge of hot highly reduced sponge iron and carbon in a substantial oxygen free environment, and is transferred or transported to a melter 10 in any appropriate method and by any appropriate means. The vessel 1 is then placed over or adjacent the melter 10, so that the outlet 4 of the vessel 1 is capable of engaging with an inlet 11 into the melter. Preferably, the melter 10 is provided with a plurality of inlets 11 in an upper surface or roof thereof. This will be described further hereinafter.

The lower or bottom end 1a of the vessel 1 is provided with a valve 15 such as shown in FIG. 3 of the accompanying drawings, so that on the outlet 4 of the vessel and the inlet 11 of the melter 10 being juxtaposed in a sealed position relative to each other, a sliding valve 15 is moved laterally, allowing matter to pass from the transfer vessel 1 into the melter inlet 11. The valving arrangement 15 includes for example a plate 16 with a handle 17 at one end thereof, the plate 16 being capable of being moved laterally of the transfer vessel 1 within a groove or space, between spring loaded seals 18, which abut against adjacent surfaces of the plate 16, thus forming a substantially air tight seal. To open the arrangement the handle 17 is gripped and the plate 16 is moved laterally outwardly, (such as in the direction of arrow "A" in FIG. 3 of the drawings). This then opens the outlet 4 and allows it to communicate with the inlet 11 of the melter 10. Once it is desired to close the opening from the vessel 1, the handle 17 is gripped and the plate pushed or slid inwardly, (so that it is in a position substantially as shown in FIG. 3 of the drawings) and into a position in which the outlet 4 from the vessel 1 will be closed and sealed. An overflow chamber 4a is provided at the lower end of the vessel 1 and adjacent a material discharge outlet 4 so that excess material gathered around the outlet 4 (which material will be moved laterally or sideways on the plate 16 being closed), will be able to overflow or exit through the overflow chamber 4a).

The above is however by way of example only. It should be appreciated that any appropriate and effective sealing arrangement and associated control or operating means can be provided in conjunction with the inlet and/or outlet to the hot transfer vessel. A plurality of transfer vessels can be used in conjunction with a plurality of inlets 11, into the melter 10, if desired.

The vessel 1 is a refractory lined container, of any appropriate shape and configuration, although one example of a shape and configuration is shown in FIG. 2 of the accompanying drawings, this allowing for straight forward and efficient transfer from the highly reduced sponge iron from a kiln to the melter.

If desired, one or more sealable inlets, 2a can be provided in the transfer vessel 1, to allow for the ingress or entry of excess carbon, or one or more inert gases (such as a supply of nitrogen); especially to allow for the entry of nitrogen into the container should this be desired (such as for the purpose of maintaining a relative high carbon content and high temperature during transfer).

During experimentation, the handling of hot reduced primary concentrate in various char mixtures ranging from 0 to 10% (by weight) has been extensively tested, measured and observed. For example with batches of up to 1300 kg in a pilot plant, at the completion of a reduction test, the reduced primary concentrate was tipped or removed by way of an enclosed chute and gate valve into the top of a refractory lined transfer container or vessel. The temperature range varied from between 800° C. and 1000° C. The refractory lined container had a lower conical section, and a sealed slide valve arrangement used to allow or permit the hot material to discharge or pass into a melter inlet arrangement. This will be described further hereinafter.

As has been described hereinbefore, even a relatively small amount of char or residual carbon, present with the highly reduced sponge iron, will rapidly form a protective blanket of carbon monoxide, over the highly reduced sponge iron, (this preventing or at least minimising reoxidation). Reference has been made to an enclosed and substantially oxygen free container or vessel, but it should be appreciated that an open topped container or vessel could be used. For example, an open topped container or vessel, carrying highly reduced sponge iron (together with an amount of char or residual carbon from the kiln), is likely to have a protective blanket of carbon monoxide formed over the highly reduced sponge iron (by the residual carbon reacting with the oxygen), this maintaining required heat and carbon content in the highly reduced sponge iron.

For example, if a container is open topped, the carbon monoxide so formed will burn to carbon dioxide and the surface will rapidly cool down to a temperature below which, significant further reoxidation will not occur. Further, it should be appreciated that any reoxidation that does occur would be restricted to a top layer of the material in the container, which will thereafter crust over and prevent or at least minimise further reoxidation of the material beneath the top layer or crust.

In use however, and in the preferred form of the invention, when the container or vessel is sealed in a substantially oxygen free manner, very minor (if any) reoxidation is likely to occur.

It should be appreciated that if any significant amount of air is admitted into the container, reoxidation can be severe which can in turn lead to localised overheating and scintering together of the oxidised material.

It is therefore preferred that the container be substantially oxygen free, and that the valving associated with the container or vessel be such as to allow for a substantially air tight or oxygen free environment within the container or vessel.

In one form of the invention, and utilising a container having a capacity of for example 10 tonnes of highly reduced sponge iron and residual carbon, the following parameters were followed:

| | |
|---|---|
| Temperature tested | 600–1000° C. |
| Metallisation | 78%–92% |
| Char (Residual carbon) (By Weight): | 0%–10% |
| Percent carbon (By Weight): | 0–8% |

In this case, measured loss of metallisation for the container or vessel was between 0 and 2%, the holding time being for a period of up to 8 hours.

The melter 10 of the present invention is an appropriate refractory lined housing having a base 26, side walls 27 and a roof or upper surface 28; one or more (and preferably a plurality of spaced apart) electrodes 30 are located and housed within the melter 10, the electrodes 30 being spaced apart from the underside 26a of the base, or bottom 26 of the melter 10.

Suitable outlets are provided in sides of the melter 10, adjacent the base thereof; the outlets 32 and 33 allow for the tapping and release of slag and liquid iron, from within the melter 10.

At an upper end or surface of the melter 10, preferably passing through the top or upper surface 28 thereof, one or more inlets 11 are provided so that highly reduced feed stock can be inserted or passed into the melter 10.

The inlets 11 are controlled inlets, provided with feed control means 35 such as in the form of a vibratory feed, a screw feed or some other appropriate means. Preferably, they are operable by an appropriate prime mover or power means, and associated with adjacent or spaced apart appropriate control means to control the speed and operation of the controlled feed means 35. For example, manual controls or electrical, electronic or hydraulic controls can be used. The controlled feed means 35 are provided within a feed housing member outwardly of the melter 10, the inlets 11 leading into and from the controlled feed means 35 into the melter 10.

In the preferred form of the invention and as shown in FIG. 2 of the accompanying drawings, the inlets 11 are adapted to be connected (as at 11a), in a substantially oxygen free or airtight manner, to a lower end of a hot transfer vessel 1, to be controlled fed into the melter 10, such as described herein by way of example. In other forms of the invention however, it is envisaged that other suitable transfer means can be used to control the feed of the highly reduced sponge iron from a vessel 1, to the melter.

For example, in one form of the invention, a conveyor can be provided being a sealed conveyor or a tubular conveyor, which is provided with an internal vibratory belt or screw feed, which is capable of being controlled externally thereof, by suitable control means, so that the amount of highly reduced sponge iron being passed through the conveyor and into the melter is controlled. Also appropriate control valves and the like can be used.

It is however, an advantage of the present invention that the passage of highly reduced sponge iron and carbon into the melter 10 is able to be controlled and monitored by the feed control means 35, so that the amount of highly reduced sponge iron entering the melter 10 can be controlled and monitored. Up until this time, no effective means have been provided for controlling the amount of such feedstock entering into melters and this has created problems with control. In addition of course, and as referred to hereinbefore such feedstock entering melters up until this time has not been highly reduced, and thus a substantial amount of reduction has also taken place in the melter, in comparison with the present invention where the feedstock or highly reduced sponge iron has already been substantially reduced prior to entry into the melter. Thus, up until this time, there have been problems in controlling and determining the standard (and in particular carbon content) of liquid iron. The present invention overcomes, or minimises this problem.

Up until this time, the substantial amounts of feedstock or partially reduced sponge iron that have passed into melters have also created problems with control, having regard to the fact that a substantial amount of further reduction has been required in the melter; this has resulted in the production of a substantial amount of gas which has caused explosions and slag boils and blows within the melter. This has also resulted in excess power being required to maintain high temperatures. Thus, there have been various problems in maintaining quality and control factors relating to carbon content within the melters.

In the present invention, where the feedstock is already highly reduced, and where passage into the melter is able to be controlled (together with the operating resistance within the melter), these problems do not arise (or are minimal), so that there is a facility for a far greater degree of control and efficiency. Samples of the slag or liquid iron can be taken at any time, and if it is desired to increase a carbon rate, excess or additional carbon can be entered through the inlets 11 in a controlled manner. On the other hand, if it is desired to increase oxygen levels within the melter, additional ore or oxygen can be entered in a controlled manner also. Again, it will be appreciated that this has not been possible in previous melters, in that the combination of ore and a source of carbon has merely been entered or passed into the melter, following which reduction took place to a substantial extent within the melter, without the facility for control, that is provided by the present invention.

It has been found in the present invention that by controlling the input of the highly reduced feedstock, a burden 40 forms at the sides within the melter 10, above a lower liquid iron layer and an upper layer of molten slag.

In the present invention, the one or more electrodes 30 extend into the melter 10 and preferably extend below the surface 38 of the liquid slag. It has been found that in use this is more efficient in the product of liquid iron, in that by having the ends 30a of the electrodes 30 submerged in the liquid slag, radiation transfer from the electrodes 30 to the inner surfaces of the melter 10 is substantially reduced, this in turn reducing or minimising refractory damage.

In addition, it has been found that by submerging the ends of the electrodes 30 in the liquid slag, more effective turbulence is imparted to the slag during operation of the melter 10. In addition, it allows for a more effective heat transfer.

In the present invention, the operation of the melter 10 has been found to be particularly effective by controlling both the input of the highly reduced feedstock, and by a suitable selection of operating resistance together with electrical voltages, or currents, this thereby allowing the carbon content of the resultant liquid iron to be accurately and easily controlled to whatever level is desired. In particular to whatever level is desired for subsequent steel making processes. Furthermore, by controlling the same electrical parameters, the slag and liquid iron temperatures can be easily controlled to give temperatures that make both constituents suitable for further handling. This therefore allows the process to operate continuously and efficiently.

These same electrical parameters also permit control of the reduction within the slag of the melter of other oxides, such as for example vanadium, silicon, titanium and manganese to provide the liquid iron with required levels of dissolved oxides and solution that are suitable for example for subsequent steel making operations.

Thus, it has been found most effective in the present invention to operate the electrodes 30 in a low resistance mode, for the reasons set out above and to apply effective appropriate turbulence in the operational or reaction zones about the one or more electrodes.

It should be appreciated that within the melter 10 various chemical reactions are constantly occuring, these serving to give rise to a steady evolution of gas. At all times, there are various reduction reactions between residual iron oxide that has not been fully reduced to metallic iron in the previous direct reduction step, and carbon from the char, that reacts to form carbon monoxide.

In a basic form, the reactions can be expressed by way of example as:

Metal Oxide+Carbon→Metal+Carbon Monoxide.

Some of these reactions in detail can be expressed as:

FeO+C→Fe+CO

SiO2+2C→Si+2CO

TiO2+2C→Ti+2CO

V2O3+3C→2V+3CO

It should be appreciated that the reduced metal oxides dissolve into liquid pig iron that has melted.

It has been found that by controlling the slag temperature and the amount of carbon that is contained in the char, (or fed with the highly reduced sponge iron), the reduction of the metal oxides can be effectively controlled to give selective reduction of vanadium and iron into the liquid pig iron together with significant amounts of carbon without excessive amounts of silicon and titanium, by well known laws or thermodynamics commonly expressed as FREE ENERGY diagrams.

As referred to hereinbefore, the use of the highly reduced sponge iron (and in addition the minimal reduction of silicon and titanium), keeps the amount of gas evolved in the melter to a minimum (especially in comparison with known methods and arrangements), this avoiding, or at least minimising, the possibility of gas explosions or slag blows, with fine grain feedstock that is preferably used.

The gas that is evolved, tends to escape through small molten pools 50 which form immediately and adjacent a reaction zone about the electrodes 30 where the gas can therefore bubble through the molten slag and escape to the surface atmosphere above the molten slag. In bubbling through the molten slag layer, escaping gas provides additional mixing and stirring, in addition to that imparted by the one or more electrodes 30 this aiding in the homogenisation of the chemical composition and temperature of the slag.

It is found therefore, that the controlled feed of the highly reduced sponge iron and the parameters referred to hereinbefore, result in a reaction zones in the form of small molten pools 50 immediately adjacent or about the one or more electrodes 30, the reaction zone(s) having turbulence imparted thereto by the electrode(s) and any escaping gases (as referred to above).

From pilot plant experimentation, the molten pool area from which gas is able to escape is formed or provided around one or more electrodes 30. For example three electrodes were provided and a pool was formed around and between the electrodes. Trials carried out with only two electrodes show that gas tends to escape from the reaction zone immediately adjacent the electrodes and the area directly between each electrode which takes on a substantially dumbbell shape.

In one form of the invention it is envisaged that a plurality of electrodes may be provided; for example six electrodes in a substantially rectangular melter. The electrodes can for example be six electrodes in line. It is anticipated that the gas will evolve around each electrode and substantially along the centre line of the melter between the electrodes.

Experimentation carried out has demonstrated that there is a substantial relationship between temperature and the reduction of metal oxides that can be effected by the carbon in the molten slag (as predicted by thermodynamics). Slag temperature should therefore be kept as low as possible to minimise the reduction of silica and titanium, but not so low that viscosity becomes excessive and reduction of vanadium trioxide does not occur.

We have found that satisfactory operation can occur in the range for example of 1450° C. to 1600° C. slag temperature, with a higher temperature being required in a pilot plant 1 tonne, or melter, compared with a 55 tonne furnace, due to higher heat losses. It is considered that a full scale operation should operate in the range of slag temperature of 1420° C. to about 1550° C.

As referred to hereinbefore, it has been found in experimentation that the controlled feed of carbon with the highly reduced sponge iron is an important control parameter, in order to maintain correct slag chemistry, that gives an appropriate low viscosity at low temperatures. Thus it has been found that entry of excessive carbon into the slag, will (as predicted from concentration effects in thermodynamics), give an excessively reducing situation. It is desirable therefore, to maintain the slag with between 2 and 4% (by weight) FeO as this has been found to significantly reduce the viscosity and allow operation at relatively low slag temperatures, while still maintaining good mixing and homogenisation of chemistry and temperature within the slag.

Referring to the slag, it has been found in experimentation in a pilot plant operation, that slag depths of up to 200 mm do not appear to have any significant undesirable effects, provided viscosity is relatively low and a good mixing is maintained.

In a 55 tonne furnace situation, slag depths of up to 500 mm have been found to work satisfactorily.

During experimentation, it has been found that trials with electrodes of 130–300 mm diameter in a pilot plant and 460 mm diameter in a 55 tonne furnace have shown no difference in operation of the process.

Various current densities have been experimented with, and it has been found that it is appropriate to use known electrodes such as for example soderberg electrodes, using about 5 amps per square centimeter of electrode cross section. In other forms of experimentation it has been found that current densities ranging from 6 amps per square centimeter to 35 amps per square centimeter of electrode cross section have worked satisfactorily.

Hereinafter set out by way of example, is data and information relating to the dimensions and parameters referred to hereinbefore in trials, carried out on 1 tonne and 55 tonne furnaces respectively.

| | MELTER OPERATION TRIALS | | | |
|---|---|---|---|---|
| | GOOD OPERATION | | CONVENTIONAL OPERATION | |
| | 1 t Furnace | 55 t Furnace | 1 t Furnace | 55 t Furnace |
| FURNACE DIMENSIONS | | | | |
| Shell Diameter (m) | 1.5 | 5.0 | 1.5 | 5.0 |
| Electrode Diameter (mm) | 130 | 460 | 130 | 460 |
| Electrode PCD (mm) | 380 | 1340 | 460 | 1340 |
| OPERATIONAL PARAMETERS | | | | |
| Feed Wt/Tapping Wt (Metal + Slag) (kg) | 230–280 | 15000–20000 | 320–360 | 15000–20000 |
| Power Input (at transformer primary) (kw) | 230–270 | 5800–6200 | 190–260 | 5000–6000 |
| Overall Operating Resistance (m) | 4.7–5.1 | 2.0–2.3 | 15–20 | 6–7 |
| Energy Consumption (KWh/tap) | 190–230 | 8000–16000 | 280–360 | 8000–11000 |

-continued

| | MELTER OPERATION TRIALS | | | |
|---|---|---|---|---|
| | GOOD OPERATION | | CONVENTIONAL OPERATION | |
| | 1 t Furnace | 55 t Furnace | 1 t Furnace | 55 t Furnace |
| FEED ANALYSIS (wt %) | | | | |
| $Fe_m$ | 58.3 | 57–56 | 58.0 | 56–59 |
| FeO | 11.8 | 14–13 | 9.0 | 10–15 |
| C | 4.7 | 4.8 | 4.8 | 4.5–5.5 |
| TAPPED METAL ANALYSIS (wt %) | | | | |
| C | 3.5–4.1 | 3.2–3.6 | 1.7–2.2 | 2–2.2 |
| Mn | 0.17–0.27 | 0.15–0.25 | 0.34–0.42 | 0.14–0.24 |
| Si | 0.08–0.2 | 0.02–0.08 | 0.80–1.30 | 0.11–0.3 |
| Ti | 0.06–0.2 | 0.01–0.09 | 0.8 + | 0.05–0.15 |
| V | 0.4–0.48 | 0.28–0.36 | 0.38–0.43 | 0.36–0.44 |
| TAPPED SLAG ANALYSIS (wt %) | | | | |
| FeO | 2–3 | 3–6 | 0.5–1.5 | 0.5–2 |
| TAPPING TEMPERATURE (°C.) | | | | |
| Metal | 1580–1600 | 1450–1510 | 1610–1670 | 1510–1580 |
| Slag | 1450–1550 | 1480–1520 | 1600–1700 | 1570–1590 |
| ENERGY DISTRIBUTION | | | | |
| Furnace Electrical Efficiency (%) | 84 | 83 | 96 | 94 |
| Furnace Thermal Efficiency (%) | 75 | 80–90 | 75 | 80–90 |
| Furnace O/A Efficiency (%) | 63 | 65–75 | 72 | 75–85 |
| Melting Requirement kWh/t Fein | 950–1200 | 900–1050 | 1100–1500 | 950–100 |

The invention has been described by way of example only and improvements and modifications may be made without departing from the scope or spirit thereof, as defined by the appended claims.

We claim:

1. A method of producing liquid iron in an electric melter having one or more electrodes therein, comprising transferring sponge iron having a degree of metallization in excess of 60%, together with residual carbon, in hot state, to said melter, substantially in the absence of oxygen; operating said one or more electrodes in said melter in a low resistance mode below about 5.1 mOhms, controlling (a) resistance of said one or more electrodes by resistance control means, and (b) passage of said sponge iron with the residual carbon into said melter by feed control means; so that carbon content of the resultant liquid iron and temperature in the melter are continuously monitored and controlled, while forming substantial liquid iron pools about and adjacent to said one or more electrodes in said melter.

2. A method as claimed in claim 1, wherein the passage of said sponge iron and residual carbon into said melter, and the operation of said one or more electrodes in a low resistance mode, are carried out substantially simultaneously.

3. A method as claimed in claim 1, using an iron bearing material having about 60% by weight of said material between 0.06 microns and 212 microns in size.

4. A method as claimed in claim 1, wherein said sponge iron is transferred to said melter, substantially in the absence of oxygen, in one or more substantially tight transfer vessels.

5. A method as claimed in claim 1, wherein said sponge iron is transferred to said melter substantially in the absence of oxygen and in one or more substantially airtight vessels, at a temperature of between 800° C. and 1,000° C.

6. A method of producing liquid iron in an electric melter, using highly reduced sponge iron having a degree of metallisation in excess of 60%, and using an iron bearing material, wherein about 60% by weight of said material is between 106 microns and 212 microns in size, comprising:

transferring said sponge iron and residual carbon to said melter substantially in the absence of oxygen;

passing controlled amounts of said sponge iron and carbon into said melter;

operating said one or more electrodes in said melter in a low resistance mode;

forming substantially liquid pools about and adjacent said one or more electrodes within said melter.

7. The method of claim 1 operating said electrodes in low resistance mode in the range of about 2.0 mOhms to about 5.1 mOhms.

* * * * *